United States Patent
An et al.

(10) Patent No.: US 11,646,502 B2
(45) Date of Patent: May 9, 2023

(54) MULTI-BAND BASE STATION ANTENNA

(71) Applicant: CommScope Technologies LLC, Hickory, NC (US)

(72) Inventors: Rui An, Suzhou (CN); Hangsheng Wen, Suzhou (CN)

(73) Assignee: CommScope Technologies LLC, Hickory, NC (US)

( * ) Notice: Subject to any disclaimer, the term of this patent is extended or adjusted under 35 U.S.C. 154(b) by 244 days.

(21) Appl. No.: 17/047,572

(22) PCT Filed: Jan. 23, 2020

(86) PCT No.: PCT/US2020/014722
§ 371 (c)(1),
(2) Date: Oct. 14, 2020

(87) PCT Pub. No.: WO2020/159786
PCT Pub. Date: Aug. 6, 2020

(65) Prior Publication Data
US 2021/0111497 A1      Apr. 15, 2021

(30) Foreign Application Priority Data

Feb. 2, 2019    (CN) .......................... 201910105925.5

(51) Int. Cl.
*H01Q 21/00*      (2006.01)
*H04B 1/00*       (2006.01)
(Continued)

(52) U.S. Cl.
CPC .......... *H01Q 21/0006* (2013.01); *H01Q 1/24* (2013.01); *H01Q 1/246* (2013.01); *H01Q 1/38* (2013.01);
(Continued)

(58) Field of Classification Search
CPC .... H01Q 21/0006; H01Q 21/12; H01Q 21/30; H01Q 1/246; H01Q 1/38; H01Q 5/378;
(Continued)

(56) References Cited

U.S. PATENT DOCUMENTS

| | | |
|---|---|---|
| 6,208,299 B1 | 3/2001 | Lindmark et al. |
| 7,250,918 B2 | 7/2007 | Puente Baliarda |
(Continued)

FOREIGN PATENT DOCUMENTS

| | | |
|---|---|---|
| EP | 1161777 A1 | 12/2001 |
| WO | 0055939 A1 | 9/2000 |
| WO | 2017065678 A1 | 4/2017 |

OTHER PUBLICATIONS

"International Search Report and Written Opinion of the International Searching Authority", International Application No. PCT/US2020/014722, dated Jun. 30, 2020, 10 pp.
(Continued)

*Primary Examiner* — Hai V Tran
(74) *Attorney, Agent, or Firm* — Myers Bigel, P.A.

(57) ABSTRACT

A multi-band base station antenna includes a linear array having a plurality of radiating elements arranged in a vertical direction. The radiating elements comprise first and second sets of radiating elements that each include one or more radiating elements. The first set of radiating elements operates in both first and second frequency bands, while the second set of radiating elements operates in the first frequency band but not in the second frequency band.

17 Claims, 7 Drawing Sheets

(51) Int. Cl.
  *H01Q 1/24* (2006.01)
  *H01Q 1/38* (2006.01)
  *H01Q 5/10* (2015.01)
  *H01Q 5/378* (2015.01)
  *H01Q 21/30* (2006.01)
  *H01Q 21/12* (2006.01)

(52) U.S. Cl.
  CPC ............... *H01Q 5/10* (2015.01); *H01Q 5/378* (2015.01); *H01Q 21/00* (2013.01); *H01Q 21/12* (2013.01); *H01Q 21/30* (2013.01); *H04B 1/00* (2013.01); *H04B 1/0064* (2013.01)

(58) Field of Classification Search
  CPC . H01Q 21/00; H01Q 5/10; H01Q 1/24; H04B 1/0064; H04B 1/00
  USPC ........................................................ 343/702
  See application file for complete search history.

(56) References Cited

U.S. PATENT DOCUMENTS

| | | |
|---|---|---|
| 2009/0135078 A1 | 5/2009 | Lindmark et al. |
| 2012/0077504 A1* | 3/2012 | Schadler ................ H01Q 19/10 343/893 |
| 2012/0280874 A1* | 11/2012 | Kim ......................... H01Q 3/06 343/763 |
| 2014/0253407 A1 | 9/2014 | Puente et al. |
| 2015/0318876 A1 | 11/2015 | Resnati et al. |
| 2018/0159215 A1 | 6/2018 | Suzuki et al. |
| 2018/0227775 A1 | 8/2018 | Bisiules et al. |
| 2019/0028159 A1 | 1/2019 | Bisiules et al. |

OTHER PUBLICATIONS

"European Search Report in Corresponding European Patent Application No. 20748081.5; dated Aug. 4, 2022; 11 Pages".

* cited by examiner

MULTI-BAND BASE STATION ANTENNA

CROSS-REFERENCE TO RELATED APPLICATIONS

The present application is a 35 U.S.C. § 371 national stage application of PCT Application No. PCT/US2020/014722, filed on Jan. 23, 2020, which itself claims priority to Chinese Patent Application No. 201910105925.5, filed Feb. 2, 2019, the entire contents of both of which are incorporated herein by reference as if set forth in their entireties. The above-referenced PCT Application was published in the English language as International Publication No. WO 2020/159786 A1 on Aug. 6, 2020.

FIELD

The present invention relates to cellular communication systems and, more particularly, to multi-band base station antennas.

BACKGROUND

Cellular communication systems are well known in the art. In a typical cellular communication system, a geographic area is divided into a series of regions that are referred to as "cells", and each cell is served by one or more base stations. A base station may include baseband equipment, a radio, and an antenna that is configured to provide two-way radio frequency ("RF") communications with fixed and mobile subscribers ("users") that are positioned throughout the cell. In many cases, the cell may be divided into a plurality of "sectors", and separate antennas provide coverage to each of the sectors. The base station antennas are often mounted on a tower or other raised structures, with the radiation beam ("antenna beam") that is generated by each antenna directed outwardly to serve a respective sector. The base station may operate in a single frequency band or may instead be a "multi-band" base station that supports communications in multiple of the cellular frequency bands.

FIG. 1 is a schematic diagram of a conventional base station 10. As shown in FIG. 1, the base station 10 includes an antenna 20 that may be mounted on a raised structure 30. In the depicted embodiment, the raised structure 30 is a small antenna tower, but it will be appreciated that a wide variety of mounting locations may be used including, for example, utility poles, buildings, water towers and the like. As is further shown in FIG. 1, the base station 10 also includes base station equipment, such as baseband units 40 and radios 42. A single baseband unit 40 and a single radio 42 are shown in FIG. 1 to simplify the drawing, but it will be appreciated that more than one baseband unit 40 and/or radio 42 may be provided. Additionally, while the radio 42 is shown as being co-located with the baseband equipment 40 at the bottom of the raised structure 30, it will be appreciated that in other cases the radio 42 may be a remote radio head that is mounted on the raised structure 30 adjacent the antenna 20. The baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44. It will also be appreciated that the base station 10 of FIG. 1 will typically include various other equipment (not shown) such as, for example, a power supply, backup batteries, a power bus, Antenna Interface Signal Group ("AISG") controllers and the like.

Typically, a base station antenna includes one or more phase-controlled arrays of radiating elements, with the radiating elements arranged in one or more vertical columns when the antenna is mounted for use. Herein, "vertical" refers to a direction that is perpendicular relative to the plane defined by the horizon. Elements in the antenna that are arranged, disposed or extend in a vertical direction means that when the antenna is mounted on a support structure for operation and there is no physical tilt, the elements are arranged, disposed or extend in a direction that is perpendicular relative to the plane defined by the horizon.

SUMMARY

A first aspect of this invention is to provide a multi-band base station antenna. The multi-band base station antenna may comprise: a linear array comprising a plurality of radiating elements arranged in a vertical direction, wherein the plurality of radiating elements comprise a first set of radiating elements and a second set of radiating elements, the first set of radiating elements comprises one or more of the plurality of radiating elements, the second set of radiating elements comprises one or more of radiating elements in the plurality of radiating elements other than the first set of radiating elements, wherein the first set of radiating elements operates in both a first frequency band and a second frequency band, wherein the first frequency band is different from the second frequency band; the second set of radiating elements operates in the first frequency band but not in the second frequency band.

A second aspect of this invention is to provide a multi-band base station antenna. The multi-band base station antenna may comprise: a linear array that includes a plurality of radiating elements, the radiating elements configured as a plurality of sub-arrays, each sub-array including at least one of the radiating elements; a feed assembly having an input that is configured to receive a first radio frequency ("RF") signal that is within a first frequency band and a second RF signal that is within a second frequency band, a plurality of outputs, and a plurality of feed paths that connect the input to the respective outputs, wherein each output is coupled to a respective one of the plurality of sub-arrays, wherein at least one, but less than all, of the feed paths includes a filter that is configured to block RF signals in the second frequency band.

A third aspect of this invention is to provide a multi-band base station antenna. The multi-band base station antenna may comprise: a dual-band linear array of radiating elements that is configured to operate in a first frequency band and in a second frequency band, a feed assembly that is configured to feed radio frequency ("RF") signals in the first frequency band and in the second frequency band to a first subset of the radiating elements in the dual-band linear array and to only feed RF signals in the first frequency band to a second sub-set of the radiating elements in the dual-band linear array.

Figure 1:
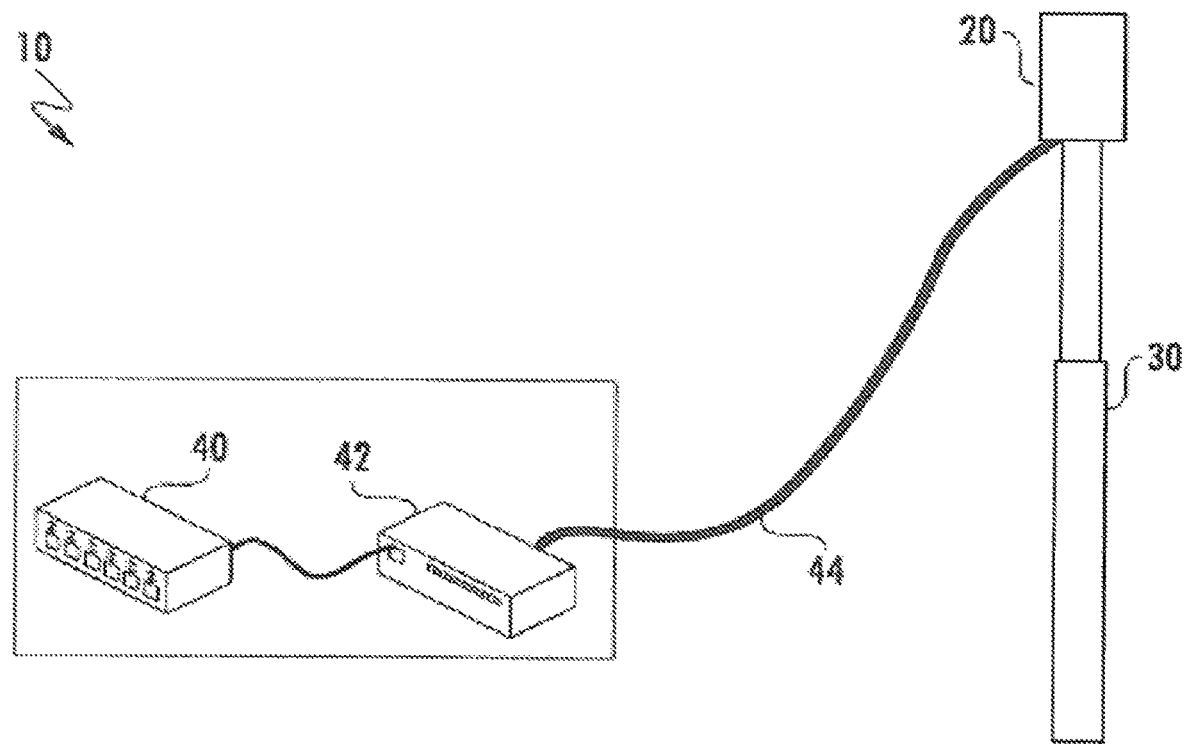
FIG. 1 is a simplified schematic diagram illustrating a conventional base station in a cellular communication system.

Note that, in some cases the same elements or elements having similar functions are denoted by the same reference numerals in different drawings, and description of such elements is not repeated. In some cases, similar reference numerals and letters are used to refer to similar elements, and thus once an element is defined in one figure, it need not be further discussed for following figures. In order to facilitate understanding, the position, size, range, etc. of the structures illustrated in the drawings may not be drawn to scale. Thus, the invention is not necessarily limited to the position, size, range, or the like as shown in the drawings.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the disclosure of the present invention more complete and fully convey the scope of the present invention to those skilled in the art. It should also be understood that the embodiments disclosed herein can be combined in any way to provide many additional embodiments.

The terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

Herein, when an element is described as located "on" "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, "coupled" is intended to encompass both direct and indirect joining of elements or other features, including connection with one or more intervening elements.

Herein, terms such as "upper", "lower", "left", "right", "front", "rear", "high", "low" may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being "below" a second feature can be then described as being "above" the second feature. The device may be oriented otherwise (rotated 90 degrees or at other orientation), and the relative spatial relationship between the features will be correspondingly interpreted.

Herein, the term "A or B" used through the specification refers to "A and B" and "A or B" rather than meaning that A and B are exclusive, unless otherwise specified.

The term "exemplary", as used herein, means "serving as an example, instance, or illustration", rather than as a "model" that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term "substantially", is intended to encompass any slight variations due to design or manufacturing imperfections, device or component tolerances, environmental effects and/or other factors. The term "substantially" also allows for variation from a perfect or ideal case due to parasitic effects, noise, and other practical considerations that may be present in an actual implementation.

Herein, certain terminology, such as the terms "first", "second" and the like, may also be used in the following description for the purpose of reference only, and thus are not intended to be limiting. For example, the terms "first", "second" and other such numerical terms referring to structures or elements do not imply a sequence or order unless clearly indicated by the context.

Further, it should be noted that, the terms "comprise", "include", "have" and any other variants, as used herein, specify the presence of stated features, steps, operations, elements, and/or components, but do not preclude the presence or addition of one or more other features, steps, operations, elements, components, and/or groups thereof.

As capacity requirements continue to increase, cellular operators are deploying base stations that operate in LTE Licensed Assisted Access (LTE-LAA) mode. Under LTE-LAA, various unlicensed frequency bands may be used in combination with licensed spectrum to deliver higher data rates for subscribers. The LTE-LAA functionality is typically implemented with indoor and outdoor small cell base stations. By distributing traffic between the licensed and unlicensed bands, LTE-LAA frees up capacity in the licensed spectrum, benefiting users on those frequency bands, as well as providing high data rate communications to other users using unlicensed spectrum.

Two frequency bands which may be used for LTE-LAA are the 3.4-3.8 GHz (which may soon be extended to 3.4-4.2 GHz) frequency band and the 5.15-5.925 GHz frequency band, or selected portions thereof. Herein, the 3.4-3.8 GHz frequency band will be referred to as the "3.5 GHz" frequency band, and the 5.15-5.925 GHz frequency band will be referred to as the "5 GHz" frequency band. LTE-LAA may be implemented by adding a 3.5 GHz radio and/or a 5 GHz radio to a conventional base station and by adding one or more linear arrays of radiating elements that operate in one or both of the 3.5 GHz and 5 GHz frequency bands to the conventional base station. In other cases, however, the base station antenna may be designed to only operate in the 3.5 GHz and 5 GHz frequency bands or selected portions thereof.

In accordance with embodiments of the present invention, a multi-band base station antenna that supports communications in multiple frequency bands is provided. The multi-band base station antenna may comprise a linear array comprising wide-band radiating elements oriented in a vertical direction, where the wide-band radiating elements may transmit and receive signals within first and second frequency bands, and the first frequency band is different from the second frequency band. The first and second frequency bands may be widely separated from each other and, for example, may be the 3.5 GHz frequency band and the 5 GHz frequency band that may be used for LTE-LAA, respectively, as described above. However, it will be appreciated that the present invention is not limited thereto, and the first and second frequency bands may also be other frequency bands supported by the wide-band radiating element, for example, may respectively be the 1.7-1.9 GHz frequency band and the 2.5-2.7 GHz frequency band, the 690-960 MHz frequency band and 1.71-2.7 GHz frequency band or the like.

For a linear array, the optimal spacing between a pair of adjacent radiating elements is frequency dependent. That is to say, the optimal spacing between a pair of adjacent radiating elements that operate in a first frequency band is different from the optimal spacing between a pair of adjacent radiating elements that operate in a second frequency band. For example, in a case where the first frequency band is higher than the second frequency band, the first optimal spacing corresponding to the first frequency band will typically be smaller than the second optimal spacing corresponding to the second frequency band. In a linear array comprising wide-band radiating elements, each wide-band radiating element may operate in the first and second frequency bands, but the spacing between a pair of adjacent wide-band radiating elements typically cannot be equal to both the first and second optimal spacing. In this case, a feasible method is to use a compromise spacing that is between the first and second optimal spacing. The inventors of the present invention have found that a compromise spacing may, in some applications, have a greater detrimental effect on the higher frequency band than on the lower frequency band. For example, a compromise spacing for the 3.5 GHz and the 5 GHz frequency band may result in a too large level of an upper sidelobe in the 5 GHz antenna pattern. Therefore, it is desirable that such a compromise spacing may favor the requirements of the higher frequency band. For example, when the first frequency band is higher than the second frequency band, the compromise spacing may be closer to the first optimal spacing.

Radiating elements in the linear array included in the multi-band base station antenna according to embodiments of the present invention may be configurably divided into two different sets. The first set of radiating elements comprises one or more radiating elements in the linear array, and the second set of radiating elements comprises one or more of radiating elements in the linear array other than the first set of radiating elements. The first set of radiating elements includes all radiating elements that operate in both the first frequency band and the second frequency band. The second set of radiating elements includes all radiating elements that operate only in the first frequency band. In other words, the first set includes all of the dual-band radiating elements but does not include any single-band radiating elements, and the second set includes all single-band radiating elements that operate in the first frequency band. Radiating elements in the first and second sets may be selected as desired.

For example, the first and second sets of radiating elements may be selected such that a radiating element in the second set is located between adjacent radiating elements in the first set. In the embodiment shown in FIG. 3, the first set of radiating elements includes radiating elements 310-1, 310-3 and the second set of radiating elements includes radiating element 310-2. Thus, in the embodiment of FIG. 3, radiating elements 310-1 and 310-3 transmit and receive signals in both the first frequency band and the second frequency band, while radiating element 310-2 only transmits and receives signals in the first frequency band. Consequently, all three radiating elements 310-1, 310-2, 310-3 are configured to operate within the first frequency band, while only radiating elements 310-1 and 310-3 operate in the second frequency band. Thus, in the case where the spacing of each pair of adjacent radiating elements in the linear array is fixed, the spacing between the radiating elements (e.g., between the radiating elements 310-1 and 310-2, or between the radiating elements 310-2 and 310-3) that transmit and receive signals within the first frequency band may be smaller than the spacing between the radiating elements (e.g., between radiating elements 310-1 and 310-3) that transmit and receive signals within the second frequency band. It may be seen that the present invention may reduce the spacing of the radiating elements in the linear array, e.g., the compromise spacing may be closer to the first optimal spacing, which helps to improve the performance of the antenna in the first frequency band (e.g., to solve the upper sidelobe problem in the 5 GHz band); on the other hand, it is also feasible to obtain a wider spacing for the radiating elements that operate in the second frequency band, which helps to ensure the performance of the antenna in the second frequency band.

In some applications, a radiating element in the second set may be included in the array but may not be located between the radiating elements in the first set. For example, the second set of radiating elements may include one or more radiating elements that are located above or below the radiating elements included in the first set of radiating elements. This configuration is also useful in some cases, for example, reducing the gain of the antenna in the second frequency band due to the second set of radiating elements not operating in the second frequency band.

Furthermore, a multi-band base station antenna in accordance with embodiments of the present invention may include one or more of the above-described linear arrays, and/or may include other conventional arrays of radiating elements. It should be noted that the linear array in the multi-band base station antenna according to embodiments of the present invention does not define a plurality of radiating elements arranged in a straight line, and the plurality of radiating elements arranged in the vertical column may be staggered in the horizontal direction. A reflector assembly in the multi-band base station antenna according to embodiments of the present invention may be flat, V-shape and variants thereof, tubular or the like, and one or more of the above-described linear arrays may be positioned on the reflector assembly in any known pattern.

Example embodiments of the present invention will now be discussed in more detail with reference to the accompanying drawings.

Figure 2:
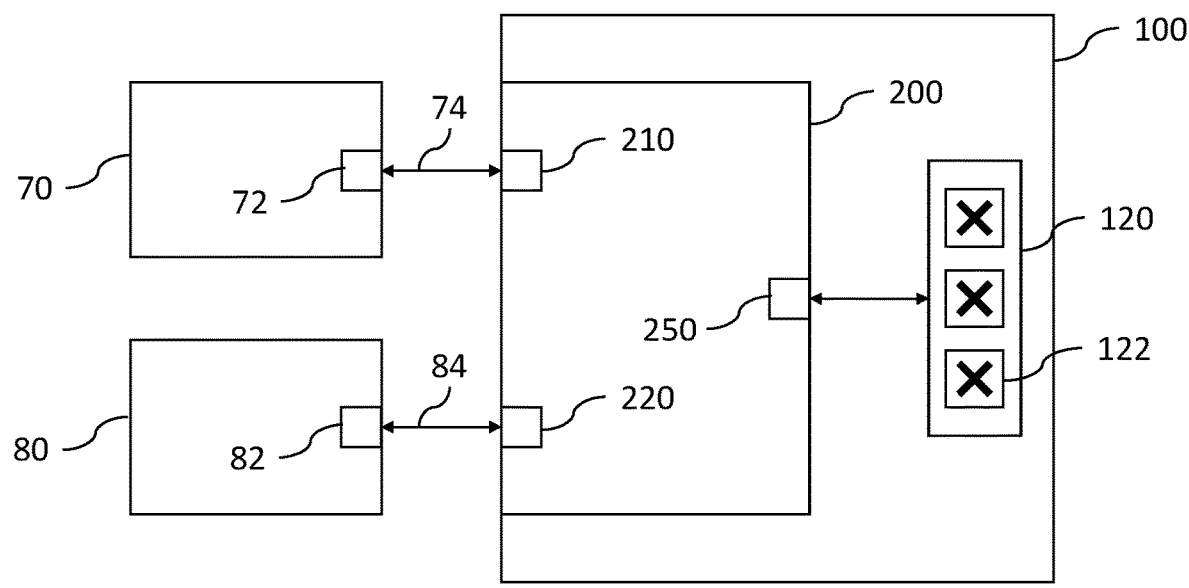
FIG. 2 is a block diagram illustrating a multi-band base station antenna according to embodiments of the present invention and its connections with radios.

FIG. 2 is a block diagram illustrating a multi-band base station antenna 100 according to embodiments of the present invention and its connections with radios 70, 80. As shown in FIG. 2, the multi-band base station antenna 100 includes a linear array 120 that includes a plurality of radiating elements 122 that are arranged in a vertical direction. In the embodiment depicted in FIG. 2, the linear array 120 includes three radiating elements 122. However, it will be appreciated that other numbers of radiating elements 122 may be included in the linear array 120. For example, the linear array 120 may include fewer or more than three radiating elements 122. Any appropriate radiating element 122 may be used including, for example, dipole, crossed dipole and/or patch radiating elements. Each of the radiating elements 122 may be identical. The radiating elements 122 may extend forwardly from the backplane on which it is mounted (where "forwardly" refers to a direction that is substantially perpendicular to the backplane and from the backplane toward the direction of signal radiation).

Figure 7:
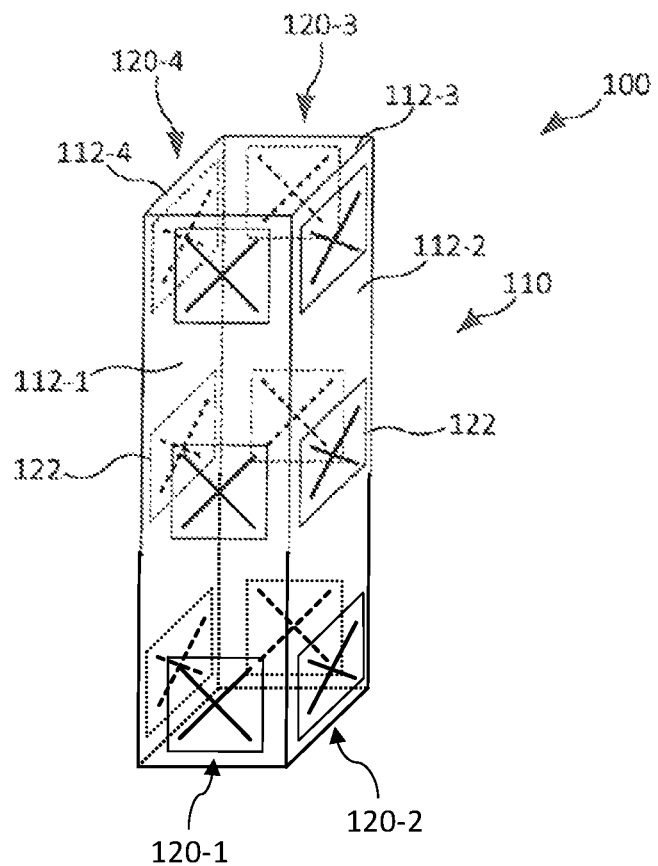
FIG. 7 is a highly simplified schematic perspective diagram illustrating a reflector assembly and linear arrays in a multi-band base station antenna according to embodiments of the present invention.
Figure 8:
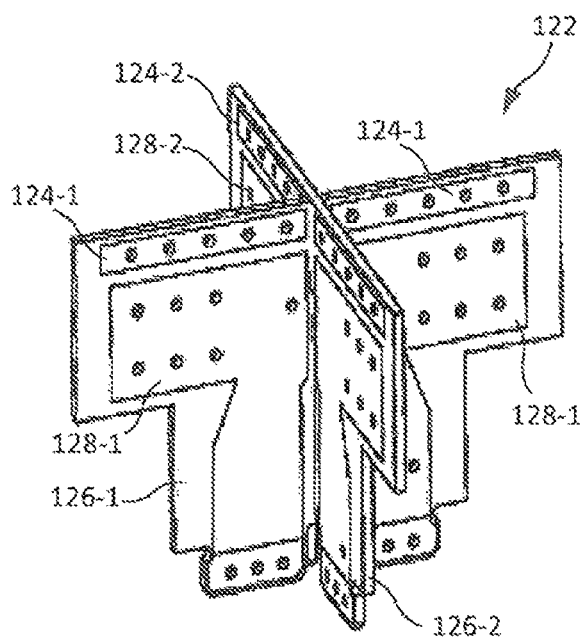
FIG. 8 is a perspective view of a multi-band crossed-dipole radiating element that may be used in a multi-band base station antenna according to embodiments of the present invention.

FIG. 8 illustrates one example implementation of the radiating elements 122. Referring to FIG. 8, each radiating element 122 may include a pair of dipole radiators, where each pair of radiators are arranged orthogonally to each other at angles +45° and −45 with respect to the longitudinal (e.g., vertical) axis of the multi-band base station antenna 100. Each radiating element 122 may be formed using a pair of printed circuit boards 126-1, 126-2. One of the printed circuit boards 126 includes a forward central slit while the other printed circuit board 126 includes a rearward central slit that allows the two printed circuit boards 126 to be mated together so as to form an "X" shape when viewed from the front. The radiating element 122 is represented by an X shape in FIGS. 2 to 5B, 7, 9 and 11.

The radiating element 122 is a wide-band radiating element that may transmit and receive signals in a first frequency band and a second frequency band, where the first frequency band is different from the second frequency band. The radiating element 122 includes a first radiator configured to transmit and receive signals within the first frequency band, and a second radiator, which parasitizes the first radiator, configured to transmit and receive signals within the second frequency band. For example, as shown in FIG. 8, the radiating element 122 may be a 3.5/5 GHz radiating element that is designed to transmit and receive signals within the 3.5 GHz band and the 5 GHz band. The radiating element 122 includes a pair of 3.5 GHz dipole arms 128-1, 128-2 that are directly driven through respective baluns (not shown). The radiating element 122 further includes a pair of 5 GHz dipole arms 124-1, 124-2 that are located forwardly of the 3.5 GHz dipole arms 128-1, 128-2. When a 3.5 GHz signal is input to a balun, it is fed directly to the 3.5 GHz dipole arms 128-1, 128-2. When a 5 GHz signal is input to the balun, the energy electromagnetically couples to the 5 GHz parasitic dipole arms 124-1, 124-2 which then resonate at 5 GHz.

Referring to FIG. 2 again, the multi-band base station antenna 100 further includes a feed network 200. The feed network 200 may be fed by a first radio 70 that operates in the first frequency band and a second radio 80 that operates in the second frequency band. For example, in an application, the first radio 70 is a 3.5 GHz radio and the second radio 80 is a 5 GHz radio. The first radio 70 has a port 72 and the second radio 80 has a port 82. Duplexing of the transmit and receive channels is performed internal to the radios 70, 80, so each port 72, 82 on the radios 70, 80 passes both transmitted and received RF signals.

The feed network 200 may have two inputs 210 and 220. The input 210 may be connected to the radio port 72, for example, via a coaxial cable 74 to receive a signal within the first frequency band, and the input 220 may be connected to the radio port 82, for example, via a coaxial cable 84 to receive a signal within the second frequency band. The feed network 200 may include an output 250 that is coupled to the linear array 120 and configured to output a combined signal comprising the signal within the first frequency band and the signal within the second frequency band. The feed network 200 may include, for example, a combiner, a diplexer or the like to combine the signals within the first and second frequency bands received by the two inputs 210 and 220, respectively, so as to generate the combined signal. It should be noted that the ports 210, 220 are referred to as "inputs" and the port 250 is referred to as an "output," which describe the case when the multi-band base station antenna 100 is transmitting RF signals. It will be appreciated that when the multi-band base station antenna 100 is receiving RF signals that the port 250 will operate as an "input" and the ports 210, 220 will operate as "outputs" due to the reversal of the direction of travel of the RF signals. Further, the term "combiner" is also described in the case when the multi-band base station antenna 100 is transmitting RF signals, and it will be appreciated that the combiner described above may operate as a divider when the multi-band base station antenna 100 is receiving RF signals.

Although the feed network 200 illustrated in FIG. 2 has one input 210 coupled to the first radio 70, one input 220 coupled to the second radio 80, and one output 250 coupled to the linear array 120, it will be appreciated that FIG. 2 is a schematic illustration of an embodiment of the present invention by taking a multi-band base station antenna 100 having single-polarized radiating elements as an example. In other embodiments, when the multi-band base station antenna 100 has dual-polarized radiating elements, the feed network 200 may include two inputs 210 connected to the first radio 70, and the first radio 70 may include two corresponding radio ports 72 so as to provide signals within the first frequency band having a first polarization and a second polarization to the feed network 200. Similarly, the feed network 200 may include two inputs 220 connected to the second radio 80, and the second radio 80 may include two corresponding radio ports 82 so as to provide feed network 200 with signals within the second frequency band having the first polarization and the second polarization. Accordingly, the feed network 200 may include two outputs 250 so as to provide the linear array 120 with a combined signal having the first polarization and a combined signal having the second polarization, respectively.

Furthermore, the multi-band base station antenna 100 may also include other conventional components not shown in FIG. 2, such as a radome, RF lens for radiating elements 122, a reflector assembly, and a plurality of circuit components and other structures mounted therein. These circuit components and other structures may include, for example, phase shifters for one or more linear arrays, remote electronic tilt (RET) actuators for mechanically adjusting phase shifters, one or more controllers, cabling connections, RF transmission lines and the like. Mounting brackets (not shown) may also be provided for mounting the base station antenna 100 to another structure, such as an antenna tower or utility pole.

Figure 3:
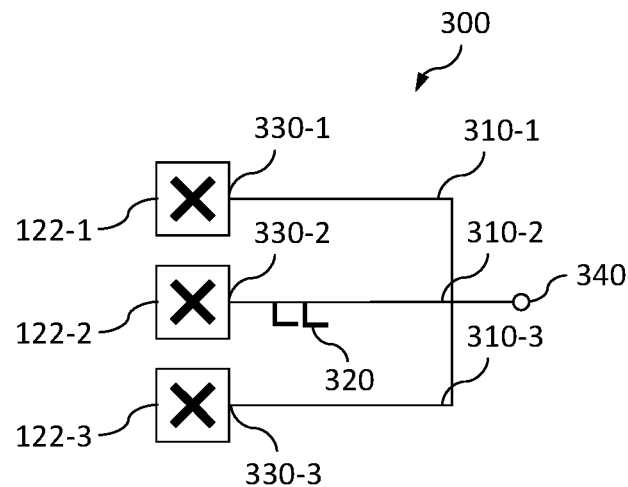
FIG. 3 is a schematic diagram illustrating a linear array and a feed assembly in a multi-band base station antenna according to embodiments of the present invention.

FIG. 3 is a schematic diagram illustrating a linear array and a feed assembly in a multi-band base station antenna according to embodiments of the present invention. The linear array includes a plurality of radiating elements 122-1, 122-2, 122-3. It should be noted that herein, when multiple like or similar elements are provided, each of them may be labeled in the drawings using a two-part reference numeral (e.g., radiating element 122-1). Such elements may be referred to herein individually by their full reference numerals (e.g., radiating element 122-1) and may be referred to collectively by the first part of their reference numeral (e.g., radiating elements 122). The plurality of radiating elements 122 includes a first set of radiating elements (including radiating elements 122-1, 122-3) that operate in the first frequency band and the second frequency band, and a second set of radiating elements (including radiating element 122-2) that operate in the first frequency band but not in the second frequency band.

The multi-band base station antenna 100 in accordance with embodiments of the present invention further includes a feed assembly 300 that feeds the radiating elements 122 in the linear array 120. The feed assembly 300 is configured to feed the radiating elements 122-1, 122-3 in the first set with the signal or a portion thereof within the first frequency band and the signal or a portion thereof within the second frequency band, and feed the radiating element 122-2 in the second set with the signal or a portion thereof within the first frequency band and without the signal or any portion thereof within the second frequency band. The feed assembly 300 include a signal input 340 that is coupled to the output 250 of the feed network 200 to receive the combined signal that comprises the signal within the first frequency band and the signal within the second frequency band. The feed assembly 300 further include first outputs 330-1, 330-3 that are coupled to the radiating elements 122-1, 122-3 in the first set, respectively, and a second output 330-2 that is coupled to the radiating element 122-2 in the second set. In addition, the feed assembly 300 further include first paths 310-1, 310-3 that are coupled between the signal input 340 and the first outputs 330-1, 330-3, and a second path 310-2 that is coupled between the signal input 340 and the output 330-2.

The first and second paths 310 included in the feed assembly 300 may each include conductive traces formed on a feed PCB (or a backplane of the reflector assembly). The first paths 310-1, 310-3 may pass a first portion of the combined signal that is received by the signal input 340 (the first portion of the combined signal including a first component of the signal within the first frequency band and a first component of the signal within the second frequency band) directly to the first outputs 330-1, 330-3 so as to feed the radiating elements 122-1, 122-3 in the first set. The second path 310-2 includes one or more filters 320 (e.g., stub filters) that are configured to pass the first frequency band and filter out the second frequency band, such that the second path 310-2 filters out any component of the signal within the second frequency band from the combined signal received by the signal input 340, and passes the second component of the signal within the first frequency band to the second output 330-2 so as to feed the radiating element 122-2 in the second set.

The linear arrays included in the multi-band antenna according to embodiments of the present invention may be viewed as having a plurality of sub-arrays of radiating elements. In the embodiment of FIG. 3, a total of three sub-arrays are provided, with each sub-array including a single radiating element 122. It will be appreciated, however, that in other embodiments two or more radiating elements 122 may be provided in one or more of the sub-arrays. In the embodiment of FIG. 3, the input 340 of the feed assembly 300 may receive a first RF signal that is within a first frequency band and may receive a second RF signal that is within a second frequency band. Feed paths 310-1 and 310-3 may pass sub-components of the first and second RF signals to the respective first and third outputs 330-1, 330-3 of the feed assembly 300 so that the sub-components of the first and second RF signals may be transmitted by radiating elements 122-1 and 122-3 (i.e., by first and third sub-arrays), respectively. Feed path 310-2 may pass a sub-component of the first RF signal to the second output 330-2 so that the sub-component of the first RF signal may be transmitted by radiating element 122-2, but feed path 310-2 includes a filter that blocks the sub-component of the second RF signal from passing to the second radiating element 122-2 (i.e., the second sub-array). Thus, the feed assembly 300 is configured to feed RF signals in the first frequency band and in the second frequency band to a first subset of the radiating elements 122 in the linear array (i.e., to a sub-set that include radiating elements 122-1 and 122-3) and to only feed RF signals in the first frequency band to a second sub-set of the radiating elements 122 in the linear array (i.e., to a sub-set that includes radiating element 122-2). It should also be noted that an average vertical spacing between the radiating elements in the linear array that transmit RF signals in the first frequency band (i.e., radiating elements 122-1 through 122-3) is different than an average vertical spacing between the radiating elements that transmit RF signals in the second frequency band (i.e., radiating elements 122-1 and 122-3).

FIGS. 4A to 4E are schematic diagrams illustrating configurations of first and second sets of radiating elements in a linear array in a multi-band base station antenna according to some embodiments of the present invention. Therein, the first sets of radiating elements are outlined by dashed lines and the second sets of radiating elements are designated by reference numerals 41 to 45, respectively. It will be appreciated that the first and second sets of radiating elements are not limited to the configurations shown in FIGS. 4A to 4E, and those skilled may select which radiating elements in the linear array are in the first set and which are in the second set according to design requirements of the antenna.

Figure 4A:
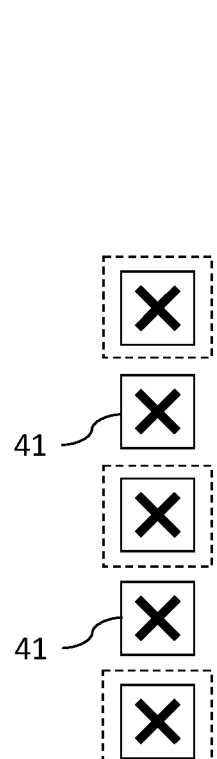
FIGS. 4A to 4E are schematic diagrams illustrating configurations of first and second sets of radiating elements in a linear array in a multi-band base station antenna according to some embodiments of the present invention.
Figure 4B:
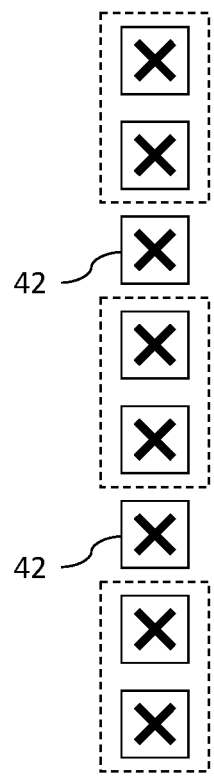
Figure 4C:
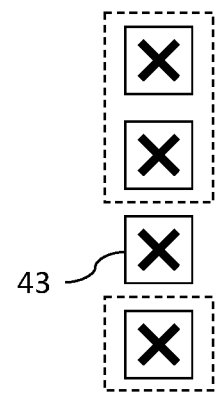

In some applications where the first frequency band is higher than the second frequency band, the first and second sets of radiating elements may be configured as shown in FIGS. 4A to 4C, wherein a radiating element in the second set is located between radiating elements in the first set in the linear array. Thus, the spacing between the radiating elements that receive and transmit signals within the second frequency band (the lower frequency band) is greater than the spacing between the radiating elements that receive and transmit signals within the first frequency band (the higher frequency band). FIGS. 4A to 4C illustrate some possible configurations. For example, as shown in FIG. 4A, each of the radiating element in the first set and each of the radiating element 41 in the second set may be arranged alternately. As shown in FIG. 4B, a pair of adjacent radiating elements 42 in the second set may be spaced by two adjacent radiating elements in the first set. As shown in FIG. 4C, two portions of the first set of radiating elements that are spaced apart by the radiating element 43 in the second set may include different numbers of radiating elements.

Figure 4D:
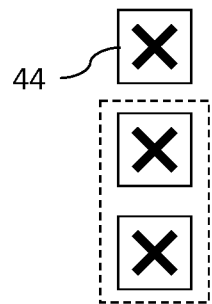
Figure 4E:
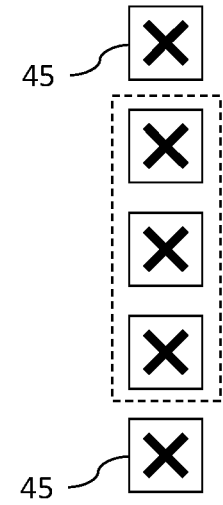

In some applications where the first frequency band is different from the second frequency band (but is not defined that the first frequency band is higher than the second frequency band), the first and second sets of radiating elements may be configured as shown in FIGS. 4D and 4E, such that the two sets of radiating elements 44, 45 are arranged above and/or below the first set of radiating elements in the vertical direction. Thus, the aperture of the linear array is reduced in the second frequency band as compared to the first frequency band, and hence the gain of the antenna in the second frequency band is reduced. Such a configuration may be used, for example, in cells with a lower signal strength requirement in the second frequency band.

Figure 5A:
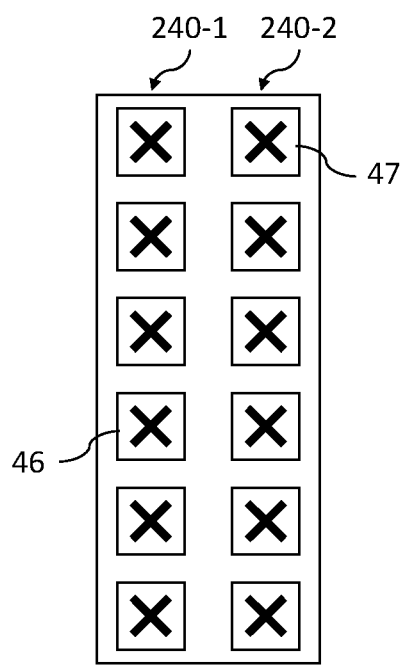
FIGS. 5A and 5B are schematic diagrams illustrating one or more linear arrays in a multi-band base station antenna according to some embodiments of the present invention.

It will be appreciated that the multi-band base station antenna 100 may include a plurality of linear arrays of radiating elements as described above. The case including two linear arrays 240-1, 240-2 is shown in FIG. 5A, where each linear array 240 may have the same configuration as the linear array 120 described above (although in FIG. 5A each linear array includes a total of six radiating elements as opposed to the three radiating elements included in linear array 120), and each radiating element in the linear array 240 may have the same structure as the radiating element 122 described above. The second sets of radiating elements of the two linear arrays 240-1, 240-2 may be in the same row or different rows (e.g., radiating elements 46, 47 in the second set as shown in FIG. 5A) in the horizontal direction. It will be appreciated that although the attached figures show only one or two linear arrays, the multi-band base station antenna 100 may include more linear arrays.

Figure 5B:
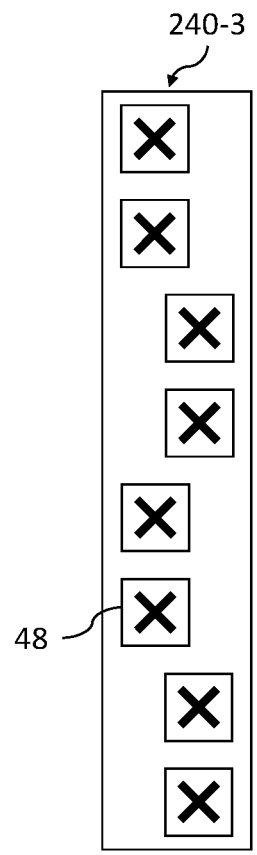

In addition, although the plurality of radiating elements in the linear array in the multi-band base station antenna according to embodiments of the present invention are arranged in a straight line in the above descriptions, the linear array may be as the linear array 240-3 shown in FIG. 5B, wherein the plurality of radiating elements may be staggered slightly in a horizontal direction. Any one or more of the radiating elements 48 may be divided into the second set of radiating elements.

Although the structures of radiating elements in the first set and radiating elements in the second set in the linear array in the multi-band base station antenna according to embodiments of the present invention are identical in the above descriptions, for example, the radiating elements 122 are all as shown in FIG. 8, it will be appreciated that radiating elements in the first set and radiating elements in the second set may be configured to have different structures, such that the first set of radiating elements operates in the first and second frequency bands and the second set of radiating elements operates only in the first frequency band.

For example, the radiating elements in the first set are configured to transmit and receive signals within the first frequency band and signals within the second frequency band. Each of the radiating elements in the first set comprises a first radiator that is configured to transmit and receive a signal within the first frequency band and a second radiator that is configured to transmit and receive a signal within the second frequency band and that parasitize the first radiator. Where the first and second frequency bands are 3.5 GHz and 5 GHz, respectively, the radiating element in the first set may be the radiating element 122 as shown in FIG. 8, which includes a pair of 3.5 GHz dipole arms 128-1, 128-2 and a pair of parasitic 5 GHz dipole arms 124-1, 124-2.

The radiating elements in the second set are configured to transmit and receive signals within the first frequency band but are not configured to transmit and receive signals within the second frequency band. For example, each of the radiating elements in the second set comprises a first radiator that is configured to transmit and receive a signal within the first frequency band but does not comprise a second radiator that is configured to transmit and receive a signal within the second frequency band. The radiating elements in the second set may be similarly formed using a pair of printed circuit boards 126-1, 126-2 positioned in an "X" shape. Where the first and second frequency bands are 3.5 GHz and 5 GHz, respectively, the radiating element in the second set may include a pair of 5 GHz dipole arms 124-1, 124-2 and not include 3.5 GHz dipole arms. At this time, the pair of 5 GHz dipole arms 124-1, 124-2 are directly driven by respective baluns.

In this case, since radiating elements in the second set do not transmit and receive signals in the second frequency band, the feed assembly that feeds the linear array may be configured to feed the first set of radiating elements with the signal within the first frequency band and the signal within the second frequency band, and feed the second set of radiating elements with the signal within the first frequency band but without the signal within the second frequency band. The feed assembly in this case may have a similar structure to the feed assembly 300 described above.

Figure 6A:
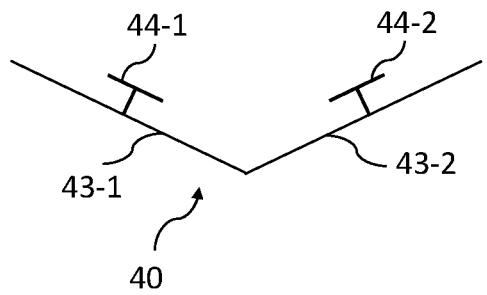
FIGS. 6A to 6C are highly simplified schematic horizontal cross-sectional diagrams illustrating linear arrays and reflector assemblies in multi-band base station antennas according to some embodiments of the present invention.
Figure 6B:
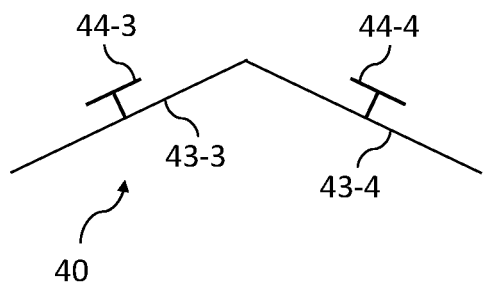
Figure 6C:
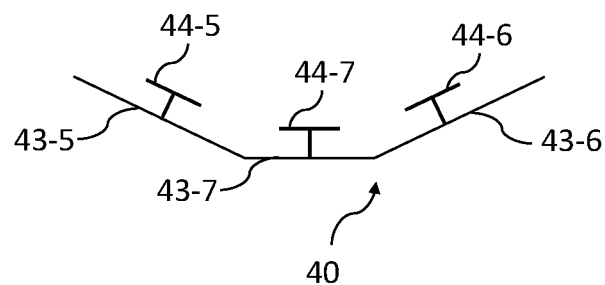

The multi-band base station antenna according to embodiments of the present invention may further include a reflector assembly. In some embodiments, the reflector assembly may be flat. For example, FIGS. 5A and 5B illustrate antennas that include flat rectangular reflectors. It will be appreciated, however, that the present invention does not limit the shape of the reflector assembly of the antenna. In some embodiments, the reflector assembly may be a V-shaped reflector assembly or variants thereof. As shown in FIGS. 6A to 6C, arrays 44-1 to 44-7 of radiating elements (represented in a T-shaped representation) are respectively mounted in any known manner and positioned in any known pattern on the backplanes 43-1 to 43-7 of the reflector assembly 40 and extend forwardly therefrom. Each of the arrays 44 of radiating elements may be one or more the above described linear arrays 120, 240. The backplanes 43 may act as both a reflector and a ground plane for the radiating elements in the arrays 44 of radiating elements mounted thereon. The reflector assemblies 40 may comprise a unitary structure or may have multiple parts.

In addition to the above-described flat reflector assembly and V-shaped reflector assembly and variants thereof, the reflector assembly may be tubular, such as a tubular reflector assembly having a triangular horizontal cross-section, a rectangular horizontal cross-section or the like.

Typically, a cell may serve users who are within a distance of, for example, 1-20 kilometers from the base station, although smaller cells are typically used in urban areas to increase capacity. In order to increase capacity, cellular operators have, in recent years, been deploying so-called "small cell" cellular base stations. A small cell base station refers to a low-power base station that may operate in licensed and/or unlicensed frequency spectrum that has a much smaller range than a typical "macro cell" base station. A small cell base station may be designed to serve users who are within a small geographic region (e.g., within tens or hundreds of meters of the small cell base station). Small cell may be used, for example, to provide cellular coverage to high traffic areas within a macro cell, which allows the macro cell base station to offload much or all of the traffic in the vicinity of the small cell base station. Small cells may be particularly effective in Long Term Evolution ("LTE") cellular networks in efficiently using the available frequency spectrum to maximize network capacity at a reasonable cost. Small cell base stations typically employ an antenna that provides omnidirectional (360 degrees) coverage in the azimuth plane and a suitable beamwidth in the elevation plane to cover the designed area of the small cell. The multi-band base station antenna according to an embodiment of the present invention, which may be used for two frequency bands of the LTE-LAA, i.e., the 3.5 GHz band and the 5 GHz band, will be described below with reference to FIGS. 7 to 9.

FIG. 7 is a highly simplified schematic perspective diagram illustrating a reflector assembly 110 and linear arrays 120-1 to 120-4 in a multi-band base station antenna 100 according to an embodiment of the present invention. The antenna 100 includes a rectangular tubular reflector assembly 110 that has four vertically-oriented linear arrays 120-1 to 120-4 of radiating elements 122 mounted thereon. Each face of the reflector assembly 110 may include a backplane 112-1 to 112-4 that may act as both a reflector and a ground plane for the radiating elements 122 of the linear arrays 120 mounted thereon. Each linear array 120 is mounted on a respective one of the backplanes 112, and may be oriented vertically with respect to the horizon when the multi-band base station antenna 100 is mounted for use. In the depicted embodiment, each linear array 120 includes a total of three radiating elements 122. It will be appreciated, however, that other numbers of radiating elements 122 may be included in the linear arrays 120. The radiating elements 122 may extend outwardly from the respective backplanes 112. Any appropriate radiating element 122 may be used including, for example, a 3.5/5 GHz radiating element 122 (described above) as shown in FIG. 8, which is designed to transmit and receive signals in both the 3.5 GHz frequency band and the 5 GHz frequency band.

As described above with reference to FIG. 8, each radiating element 122 in the linear arrays 120 includes a pair of 3.5 GHz dipole radiators that are arranged orthogonally to each other at angles 45° and +45° with respect to the vertical axis of the antenna 100. Each radiating element 122 further includes a pair of 5 GHz dipole radiators that are arranged orthogonally to each other at angles −45° and +45° with respect to the vertical axis of the antenna 100.

Figure 9:
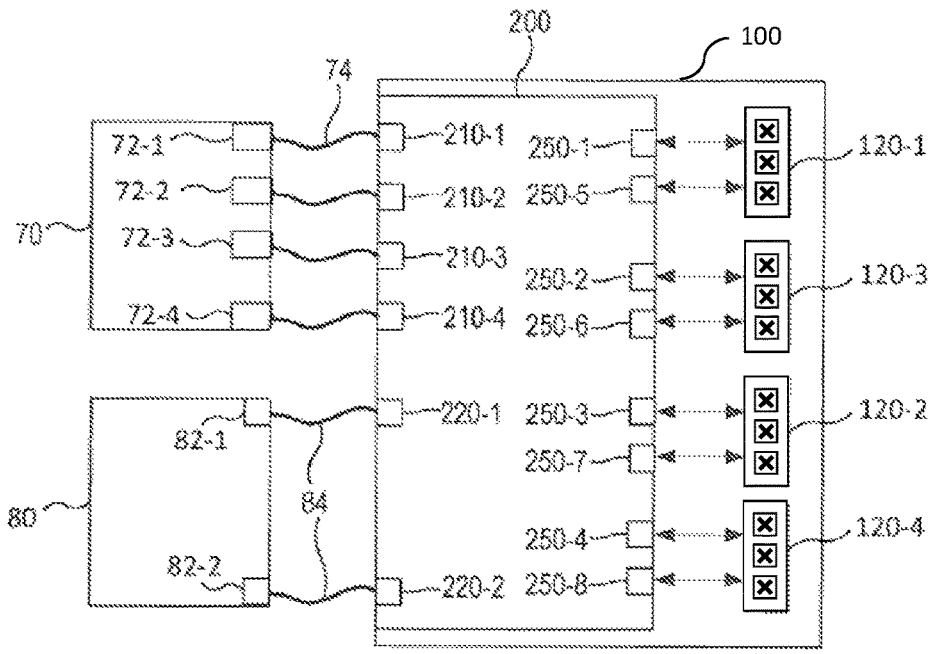
FIG. 9 is a block diagram illustrating a multi-band base station antenna according to embodiments of the present invention and its connections with radios.

As shown in FIG. 9, the base station antenna 100 may also include a feed network 200. The feed network 200 may be fed by the 3.5 GHz radio 70 and the 5 GHz radio 80. The 3.5 GHz radio 70 has four ports 72-1 through 72-4, and the 5 GHz radio 80 has two ports 82-1 and 82-2. The 3.5 GHz radio ports 72-1 and 72-3 may correspond to a first polarization and 3.5 GHz radio ports 72-2 and 72-4 may correspond to a second polarization. Radio ports 72-1 and 72-3 may each be coupled to both linear arrays 120-1 and 120-3, and radio ports 72-2 and 72-4 may each be coupled to both linear arrays 120-2 and 120-4. Thus, with respect to 3.5 GHz signals, linear arrays 120-1 and 120-3 (which are on opposed backplanes so that the linear arrays point in opposite directions) are commonly fed and generate antenna beams at each polarization that have a peanut-shaped cross-section in the azimuth plane. Similarly, linear arrays 120-2 and 120-4 (which are also on opposed backplanes so that the linear arrays point in opposite directions) are commonly fed by 3.5 GHz signals and generate antenna beams at each polarization that have a peanut-shaped cross-section in the azimuth plane. The radio port 82-1 may be a 5 GHz port with a first polarization and the radio port 82-2 may be a 5 GHz port with a second polarization. The 5 GHz radio ports 82-1 and 82-2 may each be coupled to all four linear arrays 120-1 through 120-4 so that the 5 GHz signals are transmitted through all four linear arrays 120-1 through 120-4.

The feed network 200 may have a total of six inputs 210-1 through 210-4 and 220-1, 220-2. The inputs 210-1 through 210-4 may be connected to the respective radio ports 72-1 through 72-4 via coaxial cables 74, and the inputs 220-1 and 220-2 may be connected to the radio ports 82-1 and 82-2 via coaxial cables 84, respectively. The feed network 200 may have a total of eight outputs 250-1 to 250-8. Outputs 250-1 and 250-5 are coupled to linear array 120-1, outputs 250-2 and 250-6 are coupled to linear array 120-3, outputs 250-3 and 250-7 are coupled to linear array 120-2, and outputs 250-4 and 250-8 are coupled to linear array 120-4.

Figure 10A:
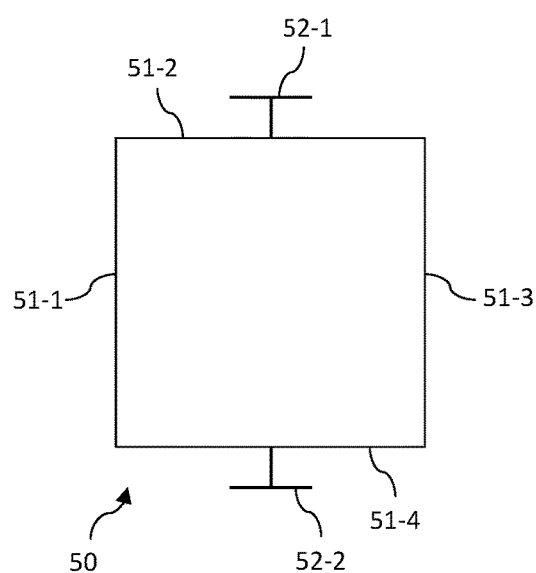
FIGS. 10A and 10B are highly simplified schematic horizontal cross-sectional diagrams illustrating linear arrays and reflector assemblies in multi-band base station antennas according to some embodiments of the present invention.
Figure 10B:
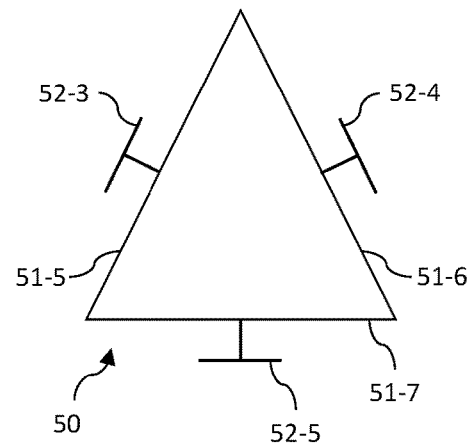

It will be appreciated that various modifications may be made to the multi-band base station antenna in accordance with embodiments of the present invention. For example, in the above-described embodiment, the invention is implemented in a base station antenna with a tubular reflector assembly having a rectangular cross-section and the linear arrays 120-1 to 120-4 are respectively positioned on four vertically extending faces of the cylindrical reflector assembly. In other embodiments, the linear arrays may be positioned on the tubular reflector assembly in other ways. As shown in FIG. 10A, a multi-band base station antenna according to an embodiment of the present invention may include a tubular reflector assembly 50 having a rectangular cross-section, and each side face (i.e., a face extending vertically) of the reflector assembly 50 may include backplane 51-1 to 51-4, respectively. The radiating element arrays 52 is mounted on the backplanes 51 and may be oriented vertically with respect to the horizon when the base station antenna 100 is mounted for use. Each of the radiating element arrays 52-1 and 52-2 may include one or more the above described linear arrays 120. The radiating element arrays 52-1 and 52-2 are positioned on opposite two backplanes of reflector assembly 50, such as backplanes 51-2 and 51-4, respectively. In another embodiment, the tubular reflector assembly may have a horizontal cross-section of other shapes, such as a triangular horizontal cross-section (as shown in FIG. 10B) or a hexagonal horizontal cross-section (not shown). As shown in FIG. 10B, the radiating element arrays 52-3 to 52-5 are mounted on the backplanes 51-5 to 51-7 of the reflector assembly 50, respectively. Each of the radiating element arrays 52-3 to 52-5 may include one or more the above described linear arrays 120.

Figure 11:
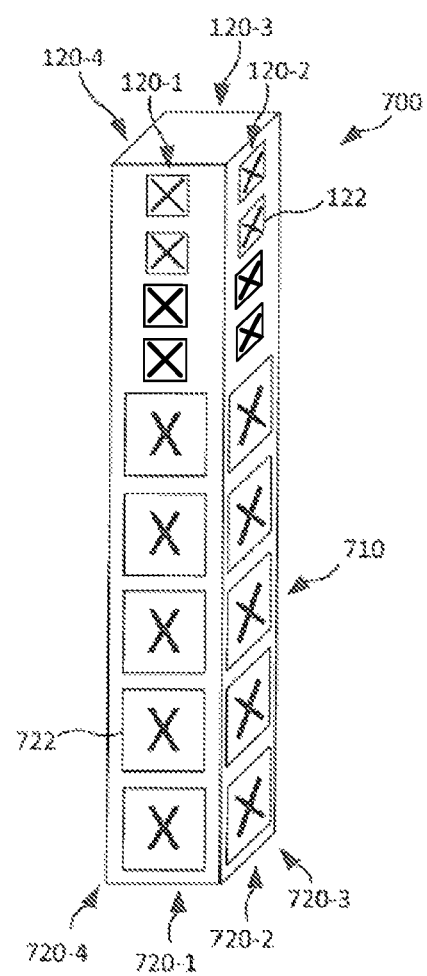
FIG. 11 is a highly simplified schematic perspective diagram illustrating a reflector assembly and linear arrays in a multi-band base station antenna according to a further embodiment of the present invention.

The multi-band base station antenna 100 in accordance with other embodiments of the present invention may include additional arrays of radiating element that operate in a third frequency band, for example, radiating element arrays that transmit and receive signals in all or part of the 696-960 MHz frequency band and/or radiating element arrays that transmit and receive signals in all or part of the 1.7-2.7 GHz frequency band. FIG. 11 is a highly simplified schematic perspective diagram illustrating a reflector assembly and linear arrays in a multi-band base station antenna 700 according to a further embodiment of the present invention. As shown in FIG. 11, the multi-band base station antenna 700 may include four linear arrays 120-1 to 120-4 of 3.5/5 GHz radiating elements 122 in the upper portion thereof, and may further include four additional linear arrays 720-1 to 720-4 of radiating elements 722. Each linear array 720 is mounted below a respective one of the linear arrays 120. The radiating elements 722 included in each linear array 720 are configured to transmit and receive signals within the third frequency band, where the third frequency band is different from the first and second frequency bands. A separate feed network (not shown) may be provided that connects the radiating elements 722 to the ports of a radio (not shown) that operates in the third frequency band.

Although some specific embodiments of the present invention have been described in detail with examples, it should be understood by a person skilled in the art that the above examples are only intended to be illustrative but not to limit the scope of the present invention. The embodiments disclosed herein can be combined arbitrarily with each other, without departing from the scope and spirit of the present invention. It should be understood by a person skilled in the art that the above embodiments can be modified without departing from the scope and spirit of the present invention. The scope of the present invention is defined by the attached claims.

That which is claimed is:

1. A multi-band base station antenna comprising:
   a linear array comprising a plurality of radiating elements arranged in a vertical direction, wherein the plurality of radiating elements comprise a first set of radiating elements and a second set of radiating elements, the first set of radiating elements comprises one or more of the plurality of radiating elements, and the second set of radiating elements comprises one or more of the radiating elements in the plurality of radiating elements that are not part of the first set of radiating elements, wherein the first set of radiating elements are configured to operate in both a first frequency band and a second frequency band that is different from the first frequency band, and wherein the second set of radiating elements are configured to operate in the first frequency band but not in the second frequency band;
   a feed assembly that is configured to feed the plurality of radiating elements in the linear array, wherein the feed assembly is configured to receive, at a signal input, a combined signal that comprises a signal within the first frequency band and a signal within the second frequency band, is configured to feed the first set of radiating elements with a first portion of the combined signal, and is configured to feed the second set of radiating elements with a second portion of the combined signal, wherein the first portion of the combined signal comprises a first component of the signal within the first frequency band and a first component of the signal within the second frequency band, and wherein the second portion of the combined signal comprises a second component of the signal within the first frequency band but not any component of the signal within the second frequency band; and
   a feed network configured to generate the combined signal, the feed network comprising:
      a first input configured to receive the signal within the first frequency band;
      a second input configured to receive the signal within the second frequency band;
      a signal output configured to output the combined signal; and
      a diplexer that couples the first and second inputs to the signal output and is configured to combine the signal within the first frequency band and the signal within the second frequency band so as to generate the combined signal,
   wherein the signal input of the feed assembly is coupled to the signal output of the feed network.

2. The multi-band base station antenna according to claim 1, wherein
   the first frequency band is higher than the second frequency band,
   the first set of radiating elements includes a first radiating element and a second radiating element,
   the second set of radiating elements includes a third radiating element, and
   the third radiating element is arranged between the first radiating element and the second radiating element in the vertical direction.

3. The multi-band base station antenna according to claim 1, wherein at least one of the radiating elements in the second set of radiating elements is arranged above and/or below all of the radiating elements in the first set of radiating elements in the vertical direction.

4. The multi-band base station antenna according to claim 1, wherein the feed assembly further comprises:
   a first output coupled to the first set of radiating elements;
   a second output coupled to the second set of radiating elements;
   a first path coupled between the signal input and the first output and configured to pass the first portion of the combined signal to the first output; and
   a second path coupled between the signal input and the second output and configured to pass the second portion of the combined signal to the second output.

5. The multi-band base station antenna according to claim 4, wherein the second path comprises a filter configured to pass the second component of the signal within the first frequency band and filter out any component of the signal within the second frequency band.

6. The multi-band base station antenna according to claim 1, wherein a structure of a radiating element in the first set of radiating elements is the same as that of a radiating element in the second set of radiating elements.

7. The multi-band base station antenna according to claim 1, wherein
   a radiating element in the first set of radiating elements includes a first radiator that is configured to transmit and receive a signal within the first frequency band and a parasitic second radiator that is configured to transmit and receive a signal within the second frequency band; and
   a radiating element in the second set of radiating elements includes a first radiator that is configured to transmit and receive a signal within the first frequency band but does not include a second radiator that is configured to transmit and receive a signal within the second frequency band.

8. The multi-band base station antenna according to claim 1, wherein a number of radiating elements in the first set of radiating elements is greater than a number of radiating elements in the second set of radiating elements.

9. The multi-band base station antenna according to claim 1, wherein the linear array is a first linear array, and the multi-band base station antenna further comprises second to fourth linear arrays whose configurations are the same as that of the first linear array, wherein the first linear array is positioned substantially opposite the third linear array and the second linear array is positioned substantially opposite the fourth linear array.

10. A multi-band base station antenna comprising:
first to fourth linear arrays, each of the first to fourth linear arrays comprising a respective plurality of radiating elements arranged in a vertical direction, wherein each plurality of radiating elements comprises a first set of radiating elements and a second set of radiating elements, the first set of radiating elements comprises one or more of the plurality of radiating elements, and the second set of radiating elements comprises one or more of the radiating elements in the plurality of radiating elements that are not part of the first set of radiating elements, wherein the first set of radiating elements are configured to operate in both a first frequency band and a second frequency band that is different from the first frequency band, and wherein the second set of radiating elements are configured to operate in the first frequency band but not in the second frequency band;
first to fourth feed assemblies that respectively feed radiating elements in the respective first to fourth linear arrays, each of the first to fourth feed assemblies being configured to:
receive a respective combined signal that comprises a signal within the first frequency band and a signal within the second frequency band;
feed the first set of radiating elements in the respective linear array with a first portion of the respective combined signal; and
feed the second set of radiating elements in the respective linear array with a second portion of the respective combined signal, wherein
the first portion of the respective combined signal comprises a first component of the signal within the first frequency band and a first component of the signal within the second frequency band; and
the second portion of the respective combined signal comprises a second component of the signal within the first frequency band but not any component of the signal within the second frequency band.

11. The multi-band base station antenna according to claim 10, wherein each of the first to fourth feed assemblies comprises:
a signal input configured to receive the respective combined signal;
a first output coupled to the first set of radiating elements in the respective linear array;
a second output coupled to the second set of radiating elements in the respective linear array;
a first path coupled between the signal input and the first output and configured to pass the first portion of the respective combined signal to the first output; and
a second path coupled between the signal input and the second output and configured to pass the second portion of the respective combined signal to the second output.

12. The multi-band base station antenna according to claim 11, wherein the second path comprises a filter, and the filter is configured to pass the second component of the signal within the first frequency band and filter out any component of the signal within the second frequency band.

13. The multi-band base station antenna according to claim 10, further comprising a feed network configured to generate first to fourth combined signals that are respectively provided to the respective first to fourth feed assemblies, the feed network comprising:
a first input configured to receive a signal within the first frequency band;
a second input configured to receive a signal within the second frequency band;
first to fourth signal outputs configured to respectively output the first to fourth combined signals;
a diplexer whose two inputs are respectively coupled to the first and second inputs, wherein the diplexer is configured to combine the signal within the first frequency band and the signal within the second frequency band so as to generate a first signal; and
a power coupler whose input is coupled to an output of the diplexer and whose first to fourth outputs are respectively coupled to the first to fourth signal outputs of the feed network, wherein the power coupler is configured to split the first signal to generate the first to fourth combined signals,
wherein the signal inputs of the first to fourth feed assemblies are respectively coupled to the first to fourth signal outputs of the feed network.

14. The multi-band base station antenna according to claim 10, wherein for each of the first to fourth linear arrays, a structure of a radiating element in the first set of radiating elements is the same as that of a radiating element in the second set of radiating elements.

15. A multi-band base station antenna, comprising:
a linear array that includes a plurality of radiating elements, the radiating elements configured as a plurality of sub-arrays, each sub-array including at least one of the radiating elements;
a feed assembly having an input that is configured to receive a combined signal comprising a first radio frequency ("RF") signal that is within a first frequency band and a second RF signal that is within a second frequency band, the feed assembly further comprising a plurality of outputs and a plurality of feed paths that respectively connect the input to the outputs, wherein each output is coupled to a respective one of the plurality of sub-arrays, and
a feed network configured to generate the combined signal, the feed network comprising:
a first input configured to receive the first RF signal;
a second input configured to receive the second RF signal;
a signal output configured to output the combined signal; and
a diplexer that couples the first and second inputs to the signal output and is configured to combine the first and second RF signals so as to generate the combined signal,
wherein at least one, but less than all, of the feed paths includes a filter that is configured to block RF signals in the second frequency band.

16. The multi-band base station antenna of claim 15, wherein each of the radiating elements has the same structure.

17. The multi-band base station antenna of claim 15, wherein the first frequency band is at higher frequencies than the second frequency band, and wherein a first of the feed paths that includes the filter is coupled to a first of the sub-arrays that is between second and third of the sub-arrays of radiating elements that are coupled to respective second and third feed paths that do not include any filter.

* * * * *